Sept. 6, 1966   R. E. ACKER   3,271,041
TANDEM ROLLERS

Filed July 15, 1964   3 Sheets-Sheet 1

INVENTOR.
BY Richard E. Acker
Ely, Pearne + Gordon
ATTORNEYS

Sept. 6, 1966  R. E. ACKER  3,271,041
TANDEM ROLLERS

Filed July 15, 1964  3 Sheets-Sheet 3

INVENTOR.
BY Richard E. Acker
Ely, Pearne + Gordon
ATTORNEYS

United States Patent Office 3,271,041
Patented Sept. 6, 1966

3,271,041
TANDEM ROLLERS
Richard E. Acker, Marion, Ohio, assignor to Huber-Warco Company, Marion, Ohio, a corporation of Ohio
Filed July 15, 1964, Ser. No. 382,883
10 Claims. (Cl. 280—43.23)

This invention relates to road machinery and more particularly to road working vericles, such as tandem rollers, which are slow moving while being operated under their own power and must be towed or carried between the work site and a storage yard or depot.

One manner of transporting road rollers has been to drive the roller onto a trailer having a flat bed and tow the trailer by a suitable tractor. This practice, however, involved the use of special tractor-trailer equipment. Thus it is desirable to employ road vehicles normally present at a construction site as towing vehicles for the rollers. In these instances, road vehicles, such as trucks are fitted with a towing hitch and the rollers are provided with a connecting trailer hitch. Since it is impractical to tow road rollers directly on their cylindrical, steel rolls, they have been provided with retractable or removable ground-engaging wheels having pneumatic tires suitable for relatively high speed highway travel. These ground-engaging wheels support the road roller so that the steel rolls are above the road surface for trailing. If the ground-engaging wheels were removable from the vehicle, it was necessary to elevate the vehicle by jacks or by driving the roller onto a ramp whenever it was desired to remove or replace the ground-engaging wheels. Rollers having retractable ground-engaging wheels have been proposed. The wheels of these rollers are mounted on the end of lever arms which in turn are pivoted to the roller frame on either side of the vehicle. These pivoted retractable wheels can obviate the problem of raising or lowering the roller by jacks or other means, since hydraulic power devices may be employed to pivot the lever arm downwardly and thereby raise the rolls off the ground.

Heretofore the pivoted retractable wheels were not wholly acceptable since these wheels were mechanically locked in a trailing position by a locking mechanism provided at the lever arm pivot point. This arrangement resulted in a relatively large moment arm which would tend to exert shear forces on the locking mechanism which were multiplied by the length of the moment arm.

It is an object of the present invention to overcome many of these problems of the prior art.

It is a more specific object of the present invention to provide ground-engaging wheels for tandem rollers which are pivotally retractable for raising the rolls to an elevated trailing position and which may be removed, if necessary, when the tandem roller is in a working or rolling position.

It is a further object of this invention to provide a locking mechanism which is axially aligned with the ground-engaging wheel to reduce the forces exerted on the locking mechanism.

Other objects and advantages of the invention will become apparent from the following detailed description and the accompanying drawings.

Figure 1:
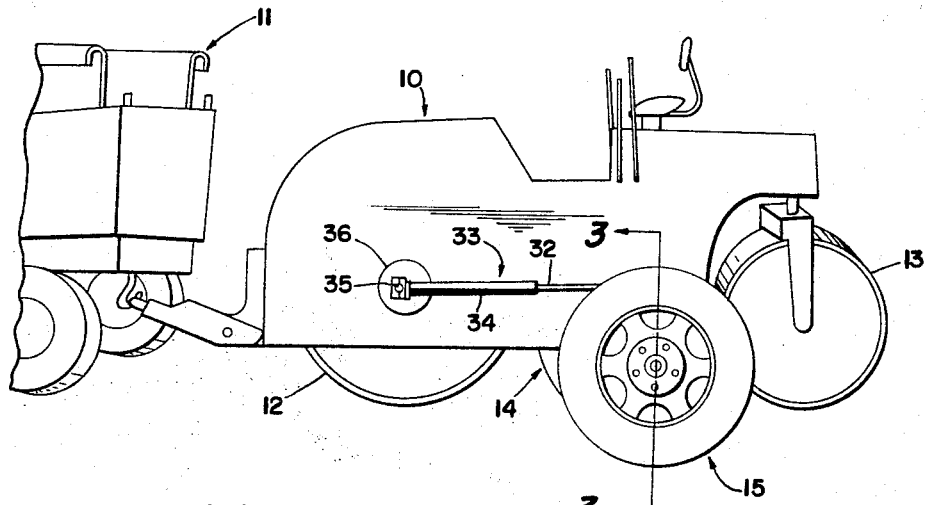
FIGURE 1 is a perspective view of a road roller hitched to a towing vehicle in a trailing position with its retractable wheels engaging the ground and with the towing vehicle shown fragmentarily.

Referring now to the drawings and particularly to FIGURE 1, a tandem road roller 10 is illustrated in a trailing position and hitched to a towing vehicle 11. The tandem road roller 10 has a drive roll 12, a steering or guide roll 13, and is provided on either side with retractable and removable ground-engaging wheel and tire essemblies 14 and 15.

Figure 3:
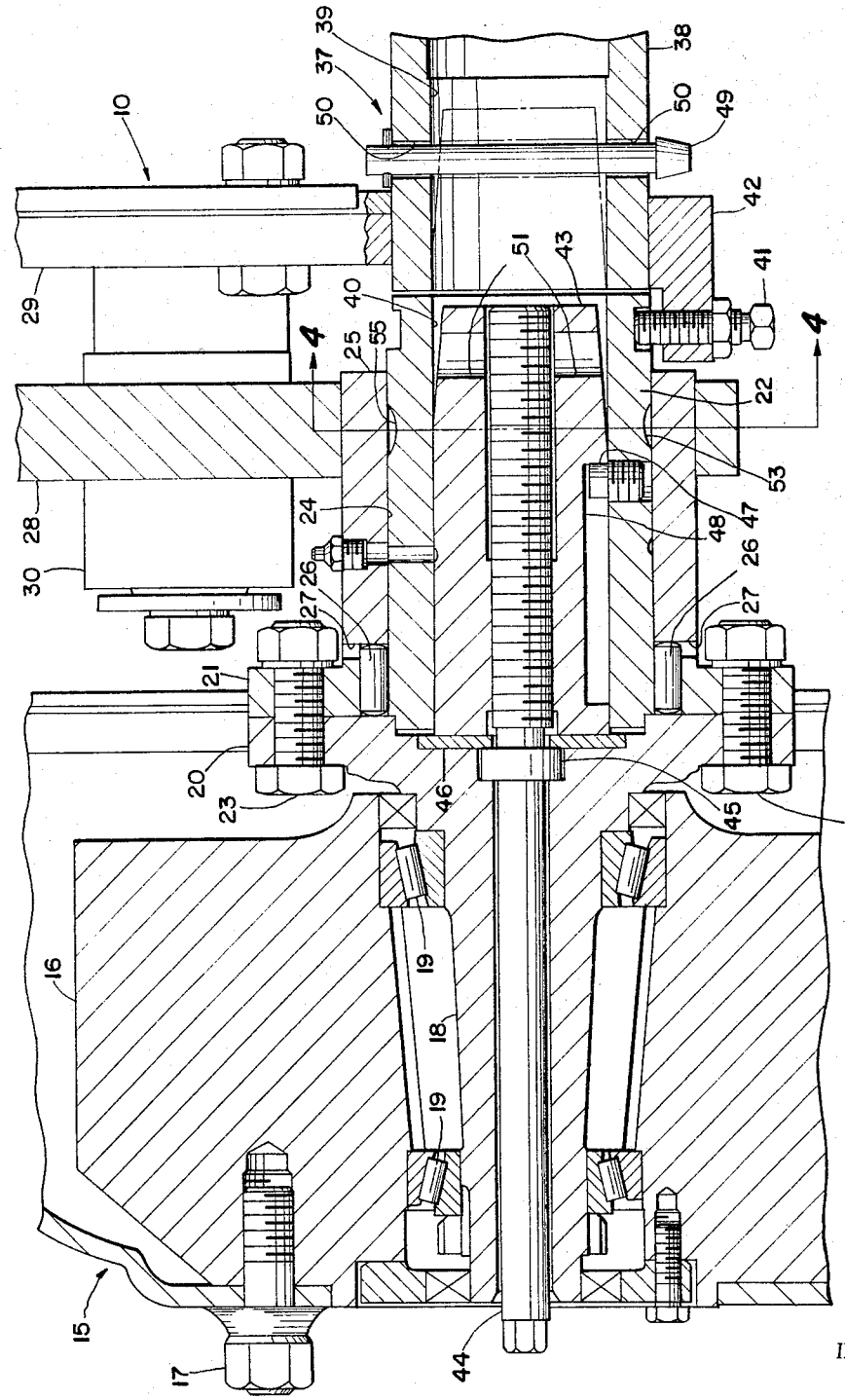
FIGURE 3 is an enlarged fragmentary sectional view, the plane of the section being indicated by the line 3—3 of FIGURE 1.

As may be seen more clearly in FIGURE 3, the assembly 15 is fixed to a standard wheel hub 16 by lock nuts 17. The hub 16 is mounted for rotation on an axle spindle 18 by bearings 19. The inner end of the spindle 18 has a flanged portion 20 which is fixed to a flanged portion 21 of a wheel hub extension 22 by bolts 23. The hub extension 22 is slidably received in the bore 24 of a cylindrical socket 25. The hub extension 22 is restrained against rotation relative to the bore 24 by spins 26 which are fixed to the flange portion 21 of the wheel hub extension 22 and extend into notches 27 which are cut into the end of the socket 25.

The cylindrical socket 25 is fixed to and extends through a lever arm or side plate 28. As may be seen more clearly in FIGURE 2, the side plate 28 is pivoted to a frame member 29 of the roller 10 by a pivotal connection 30. An upper projection 31 of the side plate 28 is pivotally connected to a ram portion 32 of a hydraulic jack 33. A cylinder portion 34 of the jack 33 is, in turn, pivotally connected to the frame of the roller 10 by a pivot pin 35 which is located near the axle carrier 36 of the drive roll 12.

Figure 2:
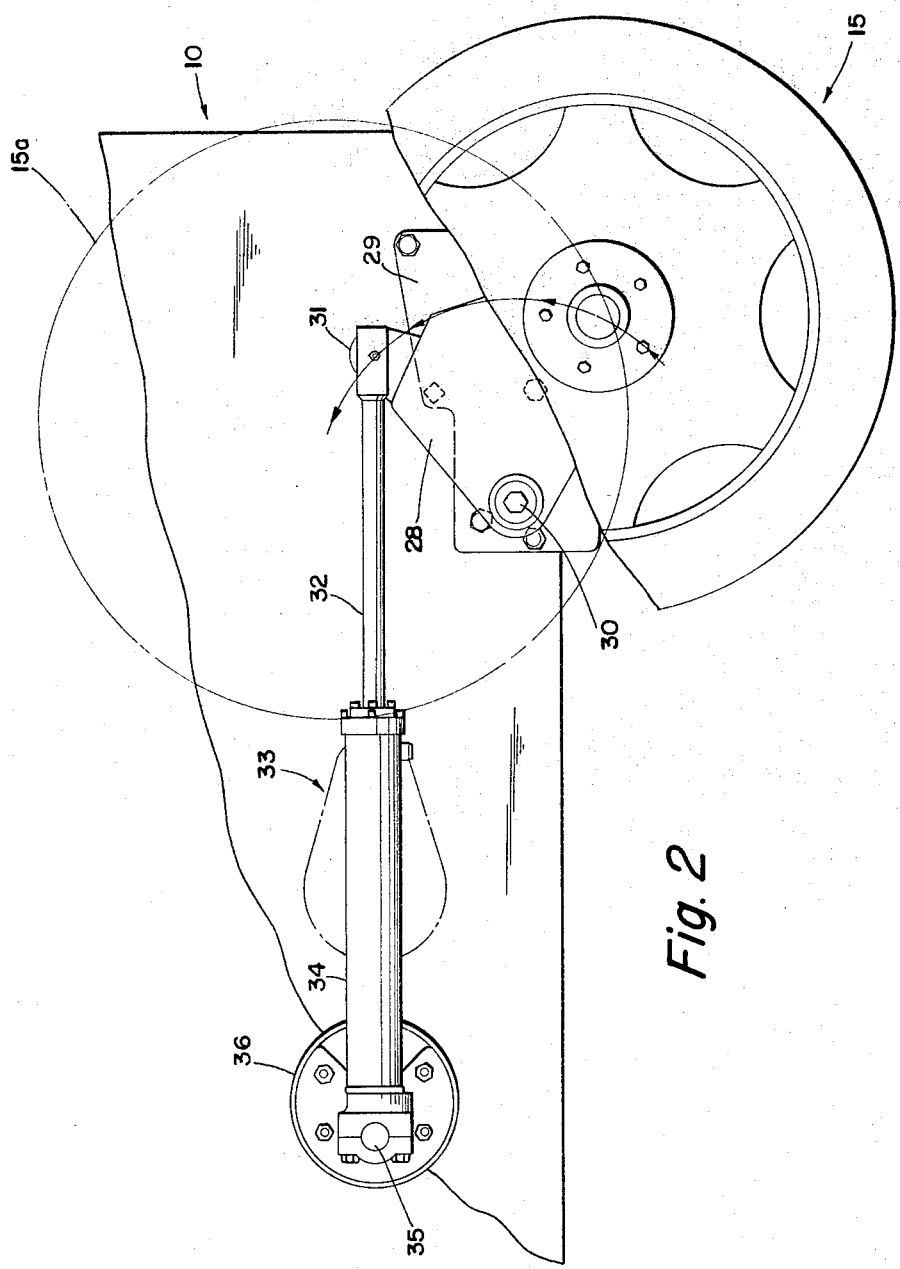
FIGURE 2 is an enlarged fragmentary elevational view of the road roller of FIGURE 1 with a ground-engaging wheel partly broken away to show details of the retracting mechanism.

The jack 33 is double acting and is operated in a conventional manner by a source of pressurized fluid (not shown). In FIGURES 1 and 2, the jack 33 is shown in a fully extended position. In this position the rolls 12 and 13 are elevated from the ground under the hydraulic force of the jack 33 and the wheel assembly 15 is in position to be fixed to the frame of the roller 10 by a locking mechanism which will be more fully described below.

When the jack 33 completes its power stroke (or nearly so), the wheel hub extension 25 is axially aligned with a trailing axle housing assembly 37. The assembly 37 comprises a tube 38 which is fixed to the frame of the roller and projects outwardly for a short distance on both sides of the roller 10. The tube 38 has an axial bore 39 which is axially aligned with a bore 40 provided in the wheel hub extension 25 when the ram 32 is fully extended to pivot the wheel assembly 15 to the position shown in FIGURES 1, 2, and 3. To aid in this axial alignment, an adjustable stop member is fixed to the tube 38 at its outer end. This stop member comprises bolt 41 which is threaded through a stop bracket 42 fixed to the tube 38 and projecting outwardly therefrom.

A locking spindle 43 is slidably received in the bore 40. A spindle screw 44 extends through the axle spindle 18 and is threaded axially through the locking spindle 43. When the spindle screw 44 is turned, the locking spindle 43 will move to the right as viewed in FIGURE 3 so that an end portion projects into the bore 39 as is shown in phantom outline. The locking spindle 43 thereby mechanically locks the wheel hub extension 22 and, therefore, the side plate 28 against pivotal movement relative to the roller frame and the tube 38. This locking arrangement provides a locking connection between the wheel assembly 15 and the roller 10 which is axially aligned with the assembly 15. When this connection is made, the hydraulic pressure employed to extend the ram 32 may be relieved if desired.

To insure that the spindle screw 44 will not move laterally within the axle spindle 18, the spindle screw 44 is provided with an enlarged portion 45 which is loosely confined in a counterbore in the axle spindle 18 by a washer 46. The locking spindle 43 is prevented from rotating with the screw 44 by a key 47 which extends into the bore 40 and cooperates with a keyway 48 cut into the locking spindle 43. To further insure that the locking spindle 43 will remain in a locked position within the bore 39, a locking pin 49 is inserted through transverse bores 50 and 51, respectively, in the tube 38 and in the locking spindle 43; otherwise, vibrations tending to rotate the screw 44 and/or side loads tending to spring the plate 28 outwardly could cause the spindle 43 to retract, especially if such factors started retraction to the point where the spindle rode on its inward taper provided to insure entry in the bore 39 despite minor misalignment.

The wheel assembly may be retracted by first withdrawing the locking pin 49 and then turning the spindle screw 44 in a clockwise direction. When the locking spindle 43 is retracted from the bore 39 and is within the bore 40, the ram 32 is retracted by relieving the hydraulic pressure in the cylinder 34 which was applied for the extension of the ram 32 and by applying fluid pressure to the other side of the ram piston until the wheel assembly 15 assumes the position shown in phantom outline in FIGURE 2. It should be appreciated, of course, that if the fluid pressure which was employed to extend the ram had been relieved while the wheel assembly was in a locked condition, the pressure should be re-applied prior to the withdrawal of the locking spindle 43.

Figure 4:
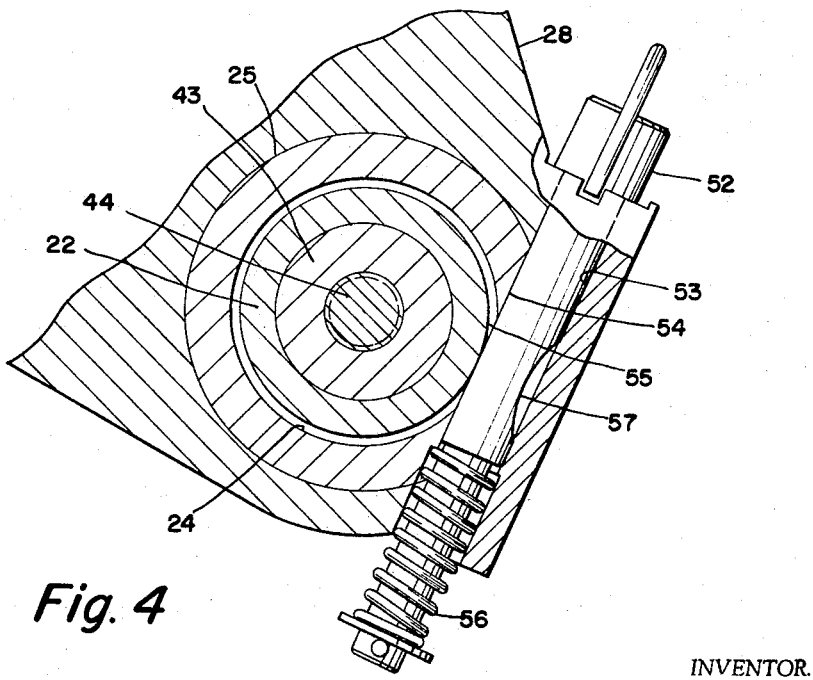
FIGURE 4 is a fragmentary sectional view, the plane of the section being indicated by the line 4—4 of FIGURE 3.

In some instances, it may be desirable or necessary to completely remove a wheel assembly in order to roll close to walls, columns, or other structures. To this end, a releasable locking mechanism is provided between the cylindrical socket 25 and the wheel hub extension 22. This locking mechanism comprises a pin 52 which extends through a bore 53 in the side plate 28 and a cooperating bore 54 in the cylindrical socket 25. As may be seen in FIGURE 4, the bore 54 intersects a portion of the bore 24 in the cylindrical socket 25. An annular groove 55 is provided on the periphery of the hub extension 22 to allow the pin 52 to lock the extension 22 against lateral movement. If it is desired to remove the extension 22 from the cylindrical socket 25, the pin 52 is pulled upwardly, as viewed in FIGURE 4, against the bias of a spring 56 and is rotated 180 degrees. In this position, the pin 52 will no longer lockingly cooperate with the groove 55, since the pin 52 has a recessed portion 57 which will permit passage of the outer cylindrical sidewall of the wheel hub extension 22. Such removal is, of course, normally accomplished when the wheel assemblies are raised so that the hub extension 22 is cleared from the alignment stop bolt 21.

It should be appreciated that although the disclosure set forth above is directed primarily to the various mechanisms for extending, retracting, and locking the wheel assembly 15 and permitting the removal of the wheel assembly 15 (together with its associated locking means) from the socket 25 carried by the plate 28, corresponding mechanisms (not shown) are provided for the wheel assembly 14.

The location of the pivot 30 for the plate 28, the length of the moment arm of the plate 28, and its throw are selected so that, when the wheel assemblies 14 and 15 are retracted by their respective jacks 33 (generally operable simultaneously by an appropriate control lever indicated in FIG. 1 but not specifically identified by a reference numeral), the wheel assemblies will be clear of the ground being worked by the rollers 12 and 13 and, when projected, all working rollers will be amply clear of the ground when the entire roller vehicle is pivoted to ride on the projected wheel assemblies and the vehicle is secured by an appropriate trailer hitch to a hauling vehicle 11. The pivot location 30 and length and throw of the plate 28 are also selected, for any particular roller vehicle so that, when the wheel assemblies are projected, their points of engagement with the ground are offset with respect to the center of gravity of the roller vehicle to provide an appropriate load on the trailer hitch, on the one hand, and, on the other hand, the roller vehicle will be sufficiently near to balance on the wheel assemblies that it can be manipulated onto the trailer hitch and trailed as a two-wheel trailer without overloading the rear springs of a tractor vehicle 11, such as a dump truck or other truck normally and conventionally available and used in road work in which the roller vehicle is used.

The scope of the invention is not limited to mechanisms employing the specific structural and operative details mentioned above. These have been given merely by way of an example of a presently preferred embodiment of the invention and may be altered by those skilled in the are without departing from the spirit and scope of the invention as defined in the appended claims. For example, although the safety locking pin 49 is usually reachable from the front of the wheel assembly in order that it may be inserted or removed to secure the wheel assembly in its projected position or allow it to be retracted, if one wishes to rely on alignment stop means, such as the bolt 41, as a dowel to resist side loads tending to spring the plate 28, the pin 49 may be replaced and turning of the screw 44 may be prevented by a suitable cotter key accessible from the outside of the wheel assembly to permit the entire locking operation to be handled from the outside of the wheel assembly. Similarly, this invention is not limited to tandem rollers as shown. For example, if the roller should be of a type having a single driven metal rear roller and the steering roller 13 is replaced by a pneumatically tired steering wheel or wheels or if the road roller should be of the pneumatically tired type, front and rear, retractable wheel mechanisms of the type disclosed may be secured to the frame of the vehicle to raise the driving rolls from the ground and permit the vehicle to be towed at relatively high speeds as a four wheel trailer, saving wear on the high-torque transmissions of such vehicles. For the same reason, retractable wheel mechanisms as shown may be mounted on the frames of other road machinery, such as graders and the like, to permit relatively high-speed towing to and from the working site, thereby saving time, operating expense, and high speed wear on the high-torque transmissions of such vehicles, and also reducing the obstruction to traffic which such vehicles present when they must move to and from the working site over traveled highways.

What is claimed is:

1. A road roller comprising a frame, road working rolls journaled in said frame, a lever arm pivoted at one end to said frame, a ground-engaging trailing wheel rotatably mounted in the other end of said lever arm, means to move said lever arm between a first position wherein said working rolls engage the ground and the trailing wheel is retracted and a second position wherein said trailing wheel engages the ground and the working rolls are retracted, a hollow member axially fixed to said wheel, and locking means cooperative with said hollow member to lock said wheel to the frame when the trailing wheel is in said second position.

2. A road roller comprising a frame, road working rolls journaled in said frame, a lever arm pivoted at one end to said frame, a ground-engaging trailing wheel rotatably mounted in the other end of said lever arm, means to move said lever arm between a first position wherein said working roll engages the ground and the trailing wheel is retracted and a second position wherein said trailing wheel engages the ground and the working rolls are retracted, a hollow member axially fixed to said wheel, and a releasable locking means comprising a spindle cooperative with said hollow member when said trailing wheel is in said second position to axially connect said trailing wheel to said frame and to maintain said rolls and wheel in said second position.

3. A road roller comprising a frame, road working rolls journaled in said frame, a lever arm pivoted at one end to said frame, a ground-engaging trailing wheel rotatably mounted in the other end of said lever arm, means to move said lever arm between a first position wherein said working rolls engage the ground and the trailing wheel is retracted and a second position wherein said trailing wheel engages the ground and the working rolls are retracted, a hollow member axially fixed to said wheel, and a locking means comprising a spindle cooperative with said hollow member and spaced from said frame, and means to move said spindle axially into and out of locking engagement with said frame when said wheel is in said second position.

4. A road roller comprising a frame, road working rolls journaled in said frame, a lever arm pivoted at one end to said frame, a ground-engaging trailing wheel rotatably mounted in the other end of said lever arm, means to move said lever arm between a first position wherein said working rolls engage the ground and the trailing wheel is retracted and a second position wherein said trailing wheel engages the ground and the working rolls are retracted, a hollow member axially fixed to said wheel, and locking means reciprocatably mounted in said hollow member, and means to connect said locking means to said frame when said trailing wheel is in said second position.

5. A road roller comprising a frame, road working rolls mounted on said frame, a lever arm pivoted at one end to said frame, a tubular socket at the other end of said lever arm, a ground-engaging wheel rotatably fixed to a wheel hub, a hollow wheel hub extension removably fixed to said wheel hub and projecting into said socket, means to releasably lock said extension within said rocket, means to move said lever arm between a first position wherein said working rolls engage the ground and the trailing wheel is retracted and a second position wherein said trailing wheel engages the ground and the working rolls are retracted, a locking spindle reciprocatably mounted within said hollow extension, and means to extend said spindle into locking engagement with said frame when said trailing wheel is in said second position.

6. A road roller comprising a frame, road working rolls mounted on said frame, a lever arm pivoted at one end to said frame, a ground-engaging trailing wheel rotatably mounted on the other end of said lever arm, means to move said lever arm between a first position wherein said working rolls engage the ground and the trailing wheel is retracted and a second position wherein said trailing wheel engages the ground and the working rolls are liftable from the ground, a hollow tube fixed to said frame and axially aligned with said trailing wheel when said trailing wheel is in said second position, a hollow member axially fixed to said wheel, and a locking means reciprocatably mounted in said hollow member and means to extend said locking means into said hollow tube to thereby axially lock said trailing wheel in said second position.

7. A road roller comprising a frame, road working rolls mounted on said frame, a lever arm pivoted at one end to said frame, a socket at the other end of said lever arm, a ground-engaging trailing wheel rotatably mounted on a wheel spindle, a hollow wheel hub extension removably fixed to said wheel hub spindle and projecting into said socket, means to releasably lock said extension within said socket, means to move said lever arm between a first position wherein said working rolls engage the ground and the trailing wheel is retracted and a second position wherein the trailing wheel engages the ground and the working rolls are liftable, and a locking means cooperative with said hollow wheel hub extension to lock said wheel and lever arm to the frame when the trailing wheel is in said second position.

8. A road roller comprising a frame, road working rolls mounted on said frame, a lever arm pivoted at one end to said frame, a socket at the other end of said lever arm, a ground-engaging trailing wheel rotatably mounted on a wheel hub spindle, a hollow wheel hub extension removably fixed to said wheel hub spindle and projecting into said hollow socket, an annular groove in the outer periphery of said wheel hub extension, a bore through said socket, a portion of said bore being coinciding with said annular groove, a pin rotatably mounted in said bore, a transverse groove in said pin at least corresponding to the cross sectional configuration of the outer surface of said wheel hub extension, means to lock said pin in a first position wherein a portion of said pin projects into said annular groove to thereby prevent axial movement of said wheel hub extension in said socket, said pin being movable in a second position wherein its said groove is sufficiently axially aligned with said wheel hub extension to thereby permit longitudinal movement of said wheel hub extension in said socket so that said wheel hub extension and its trailing wheel may be removed from said hollow socket, means to move said lever arm between a first position wherein said working rolls engage the ground and the trailing wheel is retracted and a second position wherein said trailing wheel engages the ground and the working rolls are liftable, a hollow tube fixed to said frame and axially aligned with said trailing wheel when said trailing wheel is in said second position, a locking means reciprocatably mounted on said lever arm and axially aligned with said trailing wheel, means to extend said locking means into said hollow tube to thereby axially lock said trailing wheel in said second position, and means to secure said locking means in its wheel locking position.

9. Means for securing a retractable wheel to a vehicle including a wheel rotatably mounted on an axle spindle, an axial extension carried by said spindle, a tubular socket in which said extension is normally received, means carrying said socket and mounted on said vehicle for moving said wheel from a retracted position to a vehicle supporting position in which said spindle is transverse to said vehicle, an axially movable locking member carried by said extension, a tubular member fixed to said vehicle and adapted to receive and mate with said locking member, means to move said locking member between a position entirely within said extension to a projecting position in which it is received in and mates with both said extension and said tubular member, and means to secure said locking member in said projecting position, whereby the load of the vehicle on said wheel is in part carried in shear by said locking means.

10. Means as defined in claim 9 including means for removably fixing said extension in said socket whereby said wheel, spindle, and extension may be removed from said carrying means and said means for securing said locking means in its projected position to restrain and resist side loads encountered by said wheel.

References Cited by the Examiner

UNITED STATES PATENTS

| | | | |
|---|---|---|---|
| 2,055,974 | 9/1936 | Greiner | 94—50 |
| 2,608,143 | 8/1952 | Haupt | 94—50 |
| 2,752,832 | 7/1956 | Fink | 94—50 |
| 2,878,731 | 3/1959 | Kressin | 94—50 |
| 2,985,080 | 5/1961 | Harrison et al. | 280—43.23 X |

FOREIGN PATENTS 613,863   2/1961   Canada.

BENJAMIN HERSH, *Primary Examiner.*

C. C. PARSONS, *Assistant Examiner.*